(12) United States Patent
Lagrange Moutinho Dos Reis et al.

(10) Patent No.: US 12,293,079 B2
(45) Date of Patent: May 6, 2025

(54) SYSTEMS, METHODS, AND DEVICES FOR NEAR STORAGE ELASTICITY

(71) Applicant: Samsung Electronics Co., Ltd., Suwon-si (KR)

(72) Inventors: Veronica Lagrange Moutinho Dos Reis, Cupertino, CA (US); Vishwanath Maram, San Jose, CA (US); Matthew Bryson, Los Gatos, CA (US); Gayathri Venkataraman, Santa Clara, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 115 days.

(21) Appl. No.: 17/665,490

(22) Filed: Feb. 4, 2022

(65) Prior Publication Data

US 2023/0110067 A1    Apr. 13, 2023

Related U.S. Application Data

(60) Provisional application No. 63/253,539, filed on Oct. 7, 2021.

(51) Int. Cl.
*G06F 3/06* (2006.01)
(52) U.S. Cl.
CPC ............ *G06F 3/061* (2013.01); *G06F 3/0655* (2013.01); *G06F 3/0679* (2013.01)
(58) Field of Classification Search
CPC ...... G06F 3/061; G06F 3/0655; G06F 3/0679; G06F 3/0607; G06F 3/0632; G06F 3/0635; G06F 3/0665; G06F 3/0688
See application file for complete search history.

(56) References Cited

U.S. PATENT DOCUMENTS

| 10,613,756 B2 | 4/2020 | Shin et al. |
| 10,901,914 B2 | 1/2021 | Li et al. |

(Continued)

FOREIGN PATENT DOCUMENTS

| CN | 111190550 A | 5/2020 |
| WO | 2011160094 A2 | 12/2011 |

OTHER PUBLICATIONS

European Extended Search Report for Application No. 22196362.2, mailed Mar. 3, 2023.

(Continued)

*Primary Examiner* — Jane W Benner
(74) *Attorney, Agent, or Firm* — Renaissance IP Law Group LLP

(57) ABSTRACT

A method may include receiving, at a storage device, an input and/or output (I/O) request comprising a device indication performing a determination, at the storage device, that the device indication indicates the storage device, and servicing, by the storage device, the I/O request based on the determination. The device indication may include an address for the I/O request. The method may include installing a second storage device in the storage system. The second storage device may be installed seamlessly. The first and second storage devices may be peer devices. The method may further including receiving, at the first storage device, a second I/O request including a second device indication, performing a second determination, by the first storage device, that the second device indication indicates the second storage device, and forwarding, by the first storage device, the second I/O request to the second storage device based on the second determination.

20 Claims, 12 Drawing Sheets

(56) References Cited

U.S. PATENT DOCUMENTS

| | | | | |
|---|---|---|---|---|
| 2007/0147334 A1* | 6/2007 | Guthrie | .................. | H04W 4/08 |
| | | | | 370/349 |
| 2009/0265519 A1* | 10/2009 | Moore | .................. | G06F 3/0689 |
| | | | | 711/E12.001 |
| 2014/0258598 A1* | 9/2014 | Canepa | ................. | G06F 3/0659 |
| | | | | 711/103 |
| 2019/0087352 A1 | 3/2019 | Lee et al. | | |
| 2019/0146675 A1* | 5/2019 | Subramanian | ............ | G06F 3/06 |
| | | | | 711/170 |
| 2020/0042228 A1 | 2/2020 | Roberts | | |
| 2020/0174708 A1 | 6/2020 | Liu et al. | | |
| 2021/0136145 A1* | 5/2021 | Bai | .................... | H04L 67/5682 |
| 2021/0303164 A1 | 9/2021 | Grunwald et al. | | |

OTHER PUBLICATIONS

NVM Express, Inc. "NVM Express Zoned Namespace Command Set Specification Revision 1.1a," 2021, 46 pages.

\* cited by examiner

SYSTEMS, METHODS, AND DEVICES FOR NEAR STORAGE ELASTICITY

REFERENCE TO RELATED APPLICATION

This application claims priority to, and the benefit of, U.S. Provisional Patent Application Ser. No. 63/253,539 titled "Systems, Methods, and Apparatus for Near Storage Elasticity" filed Oct. 7, 2021 which is incorporated by reference.

TECHNICAL FIELD

This disclosure relates generally to storage systems, and more specifically to systems, methods, and devices for near storage elasticity.

BACKGROUND

A storage system may provide an initial amount of storage capacity to an application. The storage capacity may be distributed across one or more storage devices. If the application needs more storage capacity than the initial amount provided by the system, the system may provide additional storage capacity, for example, by adding one or more additional storage devices. A software layer in the storage system, for example, at a client and/or a storage server, may manage metadata to keep track of which storage device or devices the application's data is stored at. The software layer may also regulate the application's access to the one or more storage devices.

The above information disclosed in this Background section is only for enhancement of understanding of the background of the inventive principles and therefore it may contain information that does not constitute prior art.

SUMMARY

A method for storing data may include receiving, at a storage device, an input and/or output (I/O) request comprising a device indication performing a determination, at the storage device, that the device indication indicates the storage device, and servicing, by the storage device, the I/O request based on the determination. The device indication may include an address for the I/O request. The storage device may be a first storage device, and the first storage device may be installed in a storage system, the method further including installing a second storage device in the storage system. The second storage device may be installed seamlessly. The first storage device and the second storage device may be peer devices. The I/O request may be a first I/O request, the device indication may be a first device indication, and the determination may be a first determination, the method further including receiving, at the first storage device, a second I/O request including a second device indication, performing a second determination, by the first storage device, that the second device indication indicates the second storage device, and forwarding, by the first storage device, the second I/O request to the second storage device based on the second determination. The method may further include servicing, by the second storage device, the second I/O request. The performing the first determination may be based on a first entry for the first storage device in a data structure, the method further including adding to the data structure, based on the installing the second storage device, a second entry for the second storage device. The performing the second determination may be based on the second entry. The first entry may include a first address range for the first storage device, and the second entry may include a second address range for the second storage device. At least a portion of the data structure may include the first entry and the second entry may be stored at the first storage device and the second storage device. The method may further include storing, in a first I/O queue, the first I/O request, and storing, in the first I/O queue, the second I/O request. The method may further include storing, in a first I/O queue, the first I/O request, and forwarding, by the first storage device, to a second I/O queue, the second I/O request. The first I/O queue may be located at the first storage device, and the second I/O queue may be located at the second storage device. The method may further include copying at least a portion of data from the first storage device to the second storage device.

A storage device may include a storage medium, a communication interface, and a control circuit including request logic configured to receive, using the communication interface, an input and/or output (I/O) request including a device indication, perform a determination that the device indication indicates the storage device, and service, using the storage medium, the I/O request based on the determination. The storage device may be a first storage device, the I/O request may be a first I/O request, the device indication may be a first device indication, the determination may be a first determination, and the request logic may be further configured to receive, using the communication interface, a second I/O request including a second device indication, perform a second determination that the second device indication indicates a second storage device, and forward, using the communication interface, the second I/O request to the second storage device based on the second determination. The storage device may be a first storage device, the determination may be based on an entry for the first storage device in a data structure, and the request logic may be further configured to generate an updated version of the data structure based on a second storage device installed in storage system with the first storage device. The request logic may be further configured to broadcast, using the communication interface, the updated version of the data structure to the second storage device. The determination may be based on an entry for the storage device in a data structure, and the request logic may be further configured to receive, using the communication interface, an updated version of the data structure.

A system may include a host, a storage device, and a communication medium coupled to the host and the storage device, wherein the host may include host logic configured to send, using the communication medium, an input and/or output (I/O) request to the storage device, wherein the I/O request may include a device indication, and wherein the storage device may include request logic configured to receive the I/O request, perform a determination that the device indication indicates the storage device, and service, by the storage device, the I/O request based on the determination. The storage device may be a first storage device, and the host logic may be further configured to perform an installation of a second storage device. The determination may be based on an entry for the first storage device in a data structure, and the request logic may be further configured to generate an updated version of the data structure based on the installation. The request logic may be further configured to send the updated version of the data structure to the second storage device.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims, To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
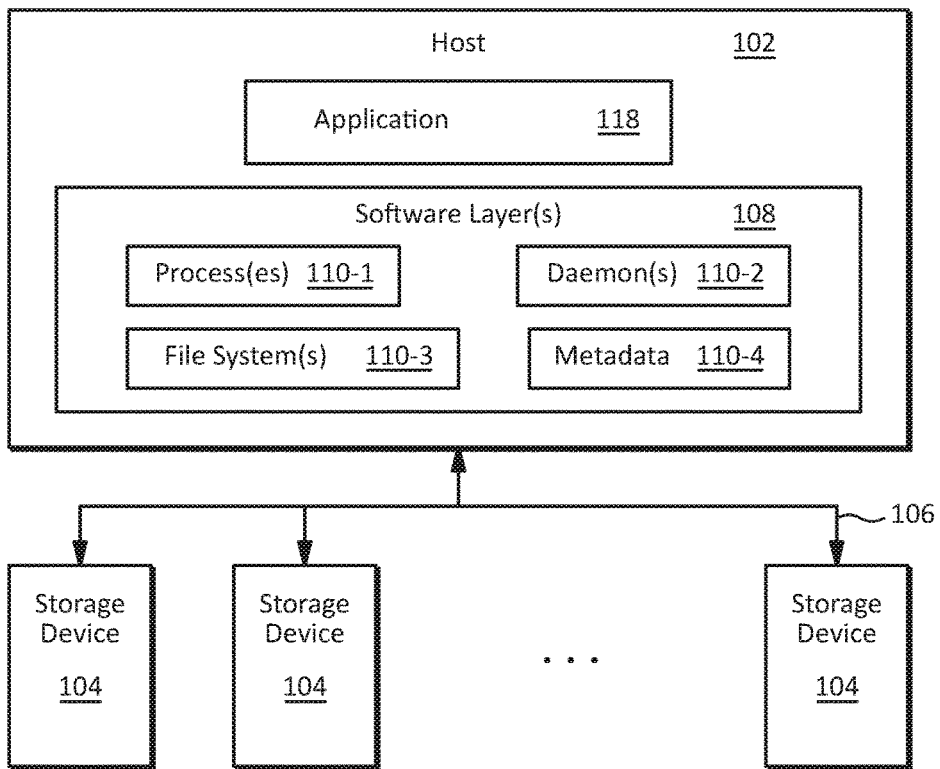
FIG. 1 illustrates an embodiment of a software-defined storage (SDS) system in accordance with example embodiments of the disclosure.

A storage system with elasticity may enable one or more storage devices to be added to, replaced in, and/or removed from, the system to modify storage capacity while the system is operating. A storage system with elasticity may be implemented as software-defined storage (SDS) in which a software layer may provide an interface between an application and the storage devices. The software layer may use metadata to track the location and/or mapping of data blocks (which may be spread across multiple storage devices), service input and/or output (I/O) requests from the application, implement a file system, and/or the like. The software layer of an SDS system, however, may degrade system performance because of problems associated with data locality, data consistency, latency caused by metadata management, and/or the like.

In a storage system in accordance with example embodiments of the disclosure, one or more storage devices may receive a request from a host and determine to service the request, or forward the request to another storage device, based on information (e.g., a data address) contained in the request. In some embodiments, a storage device may determine that it may service the request by using a data structure that may include, for example, a table of storage devices and one or more corresponding address ranges mapped to the storage devices.

The data structure may be updated, for example, based on adding one or more storage devices to, replacing one or more storage devices in, and/or removing one or more storage devices from, the storage system. In some embodiments, a copy of the data structure may be located at one or more (e.g., each) of the storage devices. In some embodiments, one or more of the storage devices may broadcast an updated data structure to one or more other storage devices, based, for example, on the addition, replacement, and/or removal of a storage device.

Thus, in some embodiments, information to enable a storage device to determine to service or forward a request may be located near storage (e.g., at each storage device) and/or may be peer-managed (e.g., updated and/or broadcast by one or more storage devices). Depending on the implementation details, this may provide elasticity in a storage system while reducing or eliminating the involvement of a system-level software layer, e.g., outside of the storage devices. Moreover, depending on the implementation details, a storage system in accordance with example embodiments of the disclosure may improve performance, for example, by reducing or eliminating problems associated with data locality, data consistency, latency caused by metadata management, and/or the like.

In some embodiments, the storage capacity of a storage system may be increased by installing a new storage device in the system, A previously installed storage device may update a data structure to include an entry for the new storage device. The new entry may include, for example, an address range for the new storage device. The previously installed storage device may broadcast the updated data structure to one or more (e.g., all) other storage devices. For example, a previously installed storage device may broadcast the updated data structure to the new storage device and all other storage devices installed in the system.

In some embodiments, a retiring storage device may be replaced by installing a replacement storage device and copying some or all of the data from the retiring storage device to the replacement storage device. Another previously installed storage device may update a data structure to remap an address range of the retiring storage device to the replacement storage device. The retiring storage device may be removed from the system, and the updated data structure may be broadcast to one or more other storage devices (e.g., to the replacement storage device and all other storage devices installed in the system).

For purposes of illustration, some example, systems, methods, apparatus, devices, and/or the like in accordance with example embodiments of the disclosure may be described in the context of some specific implementation details. However, the principles of this disclosure are not limited to any of the disclosed implementation details. For example, some embodiments may be described in the context of one or more storage devices that may use a Non-volatile Memory Express (NVMe) storage protocol, but the principles may be implemented with any protocol.

FIG. 1 illustrates an embodiment of a software-defined storage (SDS) system in accordance with example embodiments of the disclosure. The system illustrated in FIG. 1 may include a host 102 and one or more storage devices 104 that may communicate with the host 102 through one or more communication media 106. The host 102 may include one or more servers, clients, and/or the like that may run one or more system-level software layers 108 to implement an SDS system. The one or more software layers 108 may implement one or more processes 110-1, daemons 110-2, file systems 110-3, metadata structures 110-4, and/or the like, to enable the system to provide storage services such as object storage, file storage, block storage, and/or the like, to an application 118. In some embodiments, the one or more software layers 108 may enable elasticity in the system, for example, by adding, replacing, and/or removing storage devices to modify the storage capacity of the system in such a manner that the application 118 may not be aware of the number, capacity, and/or the like, of the one or more storage devices 104. In some embodiments, any of the one or more storage devices 104 may not be aware of the existence of one or more other storage devices.

In some embodiments, elasticity may refer to the ability to modify the storage capacity of a system (e.g., a running storage system) by adding, replacing, and/or removing one or more components such as one or more storage devices. In some embodiments, elasticity may further refer to shifting one or more loads between the components, for example, when a storage device is replaced. In some embodiments, one or more components may be added, replaced, and/or removed, loads may be shifted between components, and/or file descriptors may be changed, without stopping and/or interrupting the operation of a running application. In some embodiments, elasticity may be useful, for example, because an application may need more storage capacity than was originally assigned to the application, and it may be detrimental to stop or interrupt the application to add more storage capacity, update I/O settings such as file descriptors, and/or the like Examples of SDS systems that may be implemented with the system illustrated in FIG. 1 may include Ceph, Hadoop Distributed File System (HDFS), Logical Volume Manager (LVM), and/or the like. In any of these SDS systems, one or more core functions of the system may be to maintain metadata and/or run processes responsible for tracking the location of data blocks for the application on the one or more storage devices 104.

Depending on the implementation details, the one or more software layers 108 may degrade system performance because of problems associated with data locality, data consistency, overhead and/or latency caused by metadata management, and/or the like. For example, in some embodiments of SOS systems, performance may be constrained primarily by metadata management, file system management, processing associated with presenting a distributed storage system to the application, and/or the like. As another example, some embodiments of SDS systems may implement an eventual consistency policy in which a superseded copy of data may remain in the system even after the data has been updated or deleted by the application 110.

Figure 2:
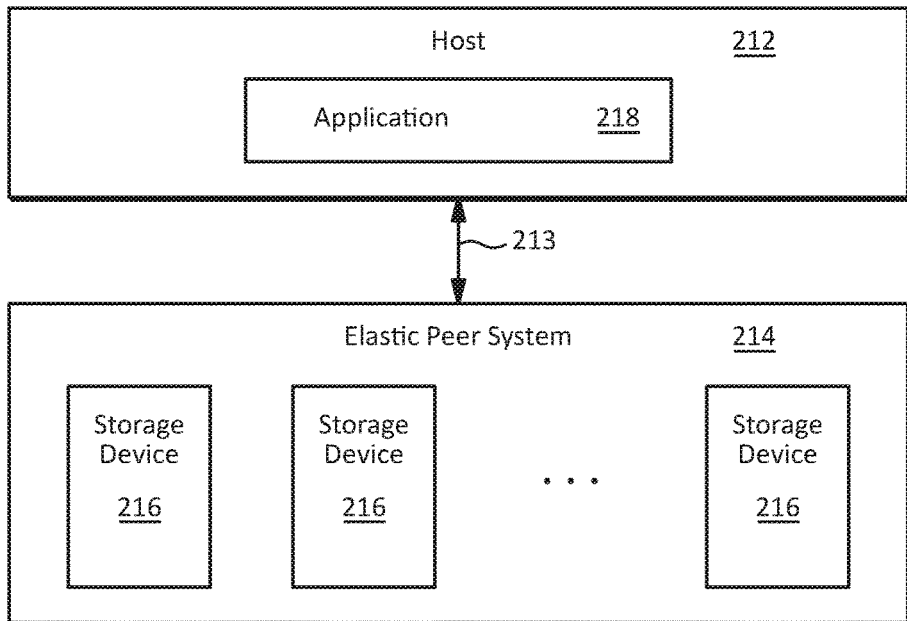
FIG. 2 illustrates an embodiment of a storage system in accordance with example embodiments of the disclosure.

FIG. 2 illustrates an embodiment of a storage system in accordance with example embodiments of the disclosure. The system illustrated in FIG. 2 may include a host 212 and an elastic peer system 214 that may communicate through a communication medium 213. The elastic peer system 214 may include one or more storage devices 216. In some embodiments, the elastic peer system 214 may implement a storage infrastructure (which may also be referred to as an ecosystem) that may modify its capacity (e.g., by adding, replacing, and/or removing one or more storage devices 216) based, for example, on a demand for storage by an application 218 running on the host 212. In some embodiments, the elastic peer system 214 may modify its capacity dynamically (e.g., while the elastic peer system 214, the host 212, and/or the application 218 are running) and/or seamlessly (e.g., in a manner that may allow the host 212 and/or the application 218 to continue operating, for example, smoothly, without interruption, and/or without a loss of performance).

In some embodiments, metadata management and/or interactions to read and/or write data to and/or from the one or more storage devices 216 may be controlled and/or executed by the elastic peer system 214 with little or no involvement by the host 212. In some embodiments, the application 218 may see and/or interact with an original storage device 216 and/or file descriptor, regardless of which of the one or more storage devices 216 may actually store the application's data at a later time. For example, an original storage device 216 may send overflow (e.g., excess) data from the application to a peer storage device 216, or the original storage device may be replaced by a replacement storage device 216 to which the application's data may be migrated. However, in some embodiments, the application 218 may continue to access its data using the storage device identifier (ID), file descriptor, and/or the like that it used with the original storage device 216.

In some embodiments, the elastic peer system 214 may replace a retiring storage device (e.g., a device with a relatively low storage capacity, a faulty device, and/or the like). In some embodiments, the retiring device may be replaced dynamically (e.g., without disrupting the application 218 while it is running on the host 212). Depending on the implementation details, this may provide fault tolerance to the elastic peer system 214.

In some embodiments, some or all of the storage devices 216 in the elastic peer system 214 may be implemented as peer devices such that there may be no primary or master device that may create a single point of failure. For example, in some embodiments, one or more of the storage devices 216 (e.g., each of the storage devices) may include, or have access to, a data structure (e.g., a peer table) that may enable the storage device 216 to determine, by analyzing an incoming I/O request from the host 212, whether it may service the request locally or forward the request to a peer storage device 216 to service the request remotely.

In some embodiments, peer devices may refer to devices that may operate cooperatively and/or independently (e.g., without a primary or master device), that may have equal or similar capabilities, that may have equal or similar importance, that may be arranged without a hierarchy, and/or the like. In some embodiments, and depending on the implementation details, some or all of the storage devices 216 in the elastic peer system 214 may be arranged to implement a non-hierarchical peer-to-peer system that may provide fault tolerance (e.g., without using erasure coding).

In some embodiments, the elastic peer system 214 may be implemented with one or more block devices, one or more near storage data structures, one or more routines that may be executed near storage, and/or the like. Thus, in some embodiments, the elastic peer system 214 may be referred to as a near storage elastic block device (NSEBD) system. However, the inventive principles are not limited to any specific types of data structures, storage devices, and/or the like. In some embodiments, one or more operations of the elastic peer system 214 may be implemented by the host 212 (e.g., by a device driver, a background process, and/or the like).

The embodiment illustrated in FIG. 2 is not limited to any specific application. For example, in some embodiments, the elastic peer system 214 may be used in combination with a software-defined storage system such as that illustrated in FIG. 1, In such an embodiment, the one or more SDS software layers 108 shown in FIG. 1 may operate on top of the elastic peer system 214 shown in FIG. 2. Depending on the implementation details, this may improve the performance of the SDS system, for example, by eliminating one or more levels of intermediary software processes used to manage storage metadata such as file physical locations, by reducing host central processing unit (CPU) utilization, reducing latencies, increasing throughput, and/or the like.

As another example, in some embodiments, the elastic peer system 214 illustrated in FIG. 2 may be used by itself (e.g., as a free-standing storage system) and accessed by the application 218 as any other block device, however, with the ability to modify its storage capacity (e.g., based on demand by the application 218), replace one or more retiring devices, and/or the like. Moreover in some embodiments, such modification, replacement, and/or the like, may be performed dynamically (e.g., while the elastic peer system 214, the host 212, and/or the application 218 are running) and/or seamlessly.

Figure 3:
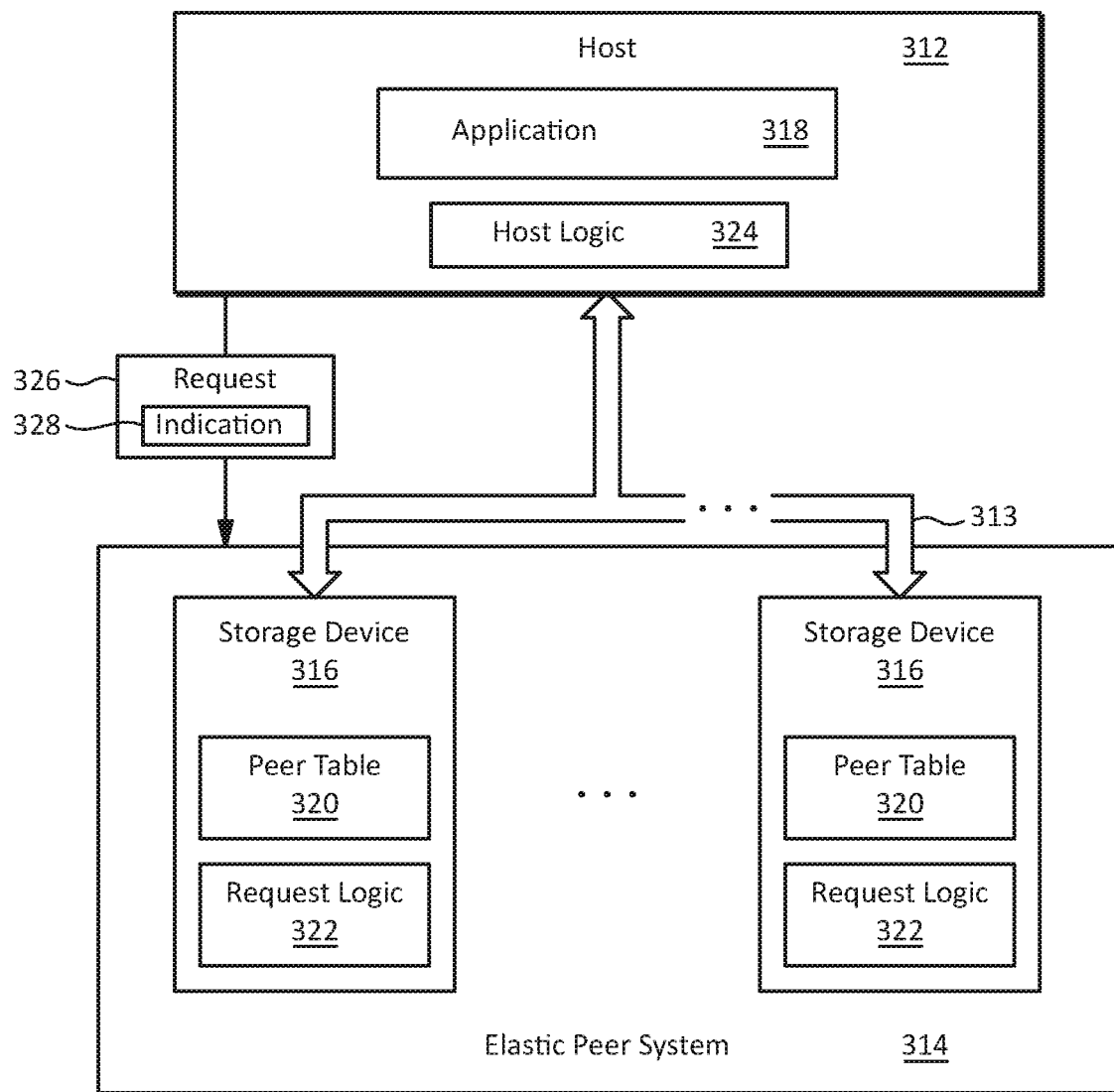
FIG. 3 illustrates an example embodiment of a storage system in accordance with example embodiments of the disclosure.

FIG. 3 illustrates an example embodiment of a storage system in accordance with example embodiments of the disclosure. The system illustrated in FIG. 3 may be used, for example, to implement the embodiment illustrated in FIG. 2.

The embodiment illustrated in FIG. 3 may include a host 312 and an elastic peer system 314 that may include one or more storage devices 316. The one or more storage devices 316 may communicate with the host 312 through any type of communication medium 313. In some embodiments, the host 312 may send one or more requests to one or more of the storage devices 316 through the communication medium 313. In some embodiments, a request 326 may include a device indication 328 (e.g., an address) that may indicate which of the one or more storage devices 316 the request 326 is intended for.

The host 312 may include host logic 324 that may implement any of the host functionality described herein such as one or more operations associated with sending. I/O requests and/or data to the one or more storage devices 316, receiving data in response to an I/O request, installing, replacing, removing, and/or the like, one or more storage devices, and/or the like.

One or more of the storage devices 316 may include a peer table 320 and/or request logic 322. A peer table 320 may include, for example, an entry for one or more of the storage devices 316 (e.g., all of the storage devices). An entry may for a storage device 316 include, for example, an address range (e.g., a logical block address (LBA) range) for the storage device.

Request logic 322 may implement, for example, any of the storage device functionality disclosed herein relating to implementation of an elastic peer system 314. Examples may include functionality relating to processing one or more I/O requests received from the host 312 or forwarded from another storage device 316, functionality relating to forwarding an I/O request from the host 312 to another storage device 316, functionality relating to adding, replacing, and/or removing one or more storage devices 316 including updating, broadcasting, and/or receiving a peer table 322, and/or the like.

The host 312 may be implemented with any apparatus such as one or more servers, clients, and/or the like that may execute or more applications 318. Examples may include storage servers (e.g., object storage servers, file servers, storage nodes, name nodes, data nodes, and/or the like), application servers, personal computers, mainframe computers, minicomputers, tablets, smart phones, and/or the like.

The communication medium 313 may be implemented with any type of network fabric, interconnect fabric, interfaces, protocols, and/or the like or any combination thereof. Examples may include PCIe, NVMe, NVMe-over-fabric (NVMe-oF), Ethernet, Transmission Control Protocol/Internet Protocol (TCP/IP), Direct Memory Access (DMA) Remote DMA (RDMA), RDMA over Converged Ethernet (ROLE), FibreChannel, InfiniBand, Serial ATA (SATA), Small Computer Systems Interface (SCSI), Serial Attached SCSI (SAS), iWARP, and/or the like, or any combination thereof.

For example, in some embodiments, communication medium 313 may be implemented with an NVMe protocol operating over a PCIe interconnect fabric. As another example, in some embodiments, communication medium 313 may be implemented with an NVMe-oF protocol operating over an Ethernet fabric.

In some embodiments, the communication medium 313 may implement a coherent (e.g., memory coherent, cache coherent, and/or the like) or memory semantic interface such as Compute Express Link (CXL), and/or a coherent protocol such as CXL.mem, CXL.cache, and/or CXL.IO. Other examples of coherent and/or memory semantic interfaces and/or protocols may include Gen-Z, Coherent Accelerator Processor Interface (CAPI), Cache Coherent Interconnect for Accelerators (CCIX), and/or the like.

In some embodiments, the communication medium 313 may implement peer-to-peer communication, for example, as disclosed in U.S. Patent Application Publication No. 2019/0087352 which is incorporated by reference.

In some embodiments, the communication medium 313 may be implemented with a protocol that may be flexible enough to accommodate switched and/or bused networks, interconnects, and/or the like.

In some embodiments, the one or more storage devices 316 may be implemented with any type of storage device having even a minimal amount of processing functionality to implement some or all of a peer table and/or request logic and based on any type of storage media such as, for example, solid state media (e.g., a solid state drive (SSD)), magnetic media (e.g., a hard disk drive (HDD)), optical media, and/or the like. For example, in some embodiments, a storage device may be implemented as an SSD based on not-AND (NAND) flash memory, persistent memory such as cross-gridded nonvolatile memory, memory with bulk resistance change, phase change memory (PCM), and/or the like, or any combination thereof.

The one or more storage devices 316 may be implemented in any form factor such as 3.5 inch, 2.5 inch, 1.8 inch, M.2, Enterprise and Data Center SSD Form Factor (EDSFF), NF1, and/or the like, using any connector configuration such as SATA, SCSI, SAS, U.2, and/or the like. Any such storage devices may be implemented entirely or partially with, and/or used in connection with, a server chassis, server rack, dataroom, datacenter, edge datacenter, mobile edge datacenter, and/or any combinations thereof.

Any of the functionality described herein, including the peer table 320, request logic 322, and/or host logic 324 may be implemented with hardware, software or a combination thereof including combinational logic, sequential logic, one or more timers, counters, registers, and/or state machines, one or more complex programmable logic devices (CPLDs), field programmable gate arrays (FPGAs), application specific integrated circuits (ASICs), central processing units (CPUs) such as complex instruction set computer (CISC) processors such as x86 processors and/or reduced instruction set computer (RISC) processors such as ARM processors, graphics processing units (GPUs), neural processing units (NPUs), tensor processing units (TPUs) and/or the like, executing instructions stored in any type of memory, or any combination thereof. In some embodiments, one or more components may be implemented as a system-on-chip (SOC).

In some embodiments, the one or more storage devices 316 may be implemented with any type of storage device having processing capacity and/or memory to implement the peer table 320 and/or request logic 322. Depending on the implementation details, this may be a minimal amount of processing capacity and/or memory. For example, in some embodiments, the processing involved may be relatively simple, and the memory may be minimal for an elastic peer system using between 2 and 16 storage devices. This type of processing capacity and/or memory may be available, for example, as spare capacity in a processor that may be found in a protocol controller (e.g., NVMe controller), storage device controller, and/or the like in a storage device.

Figure 4:
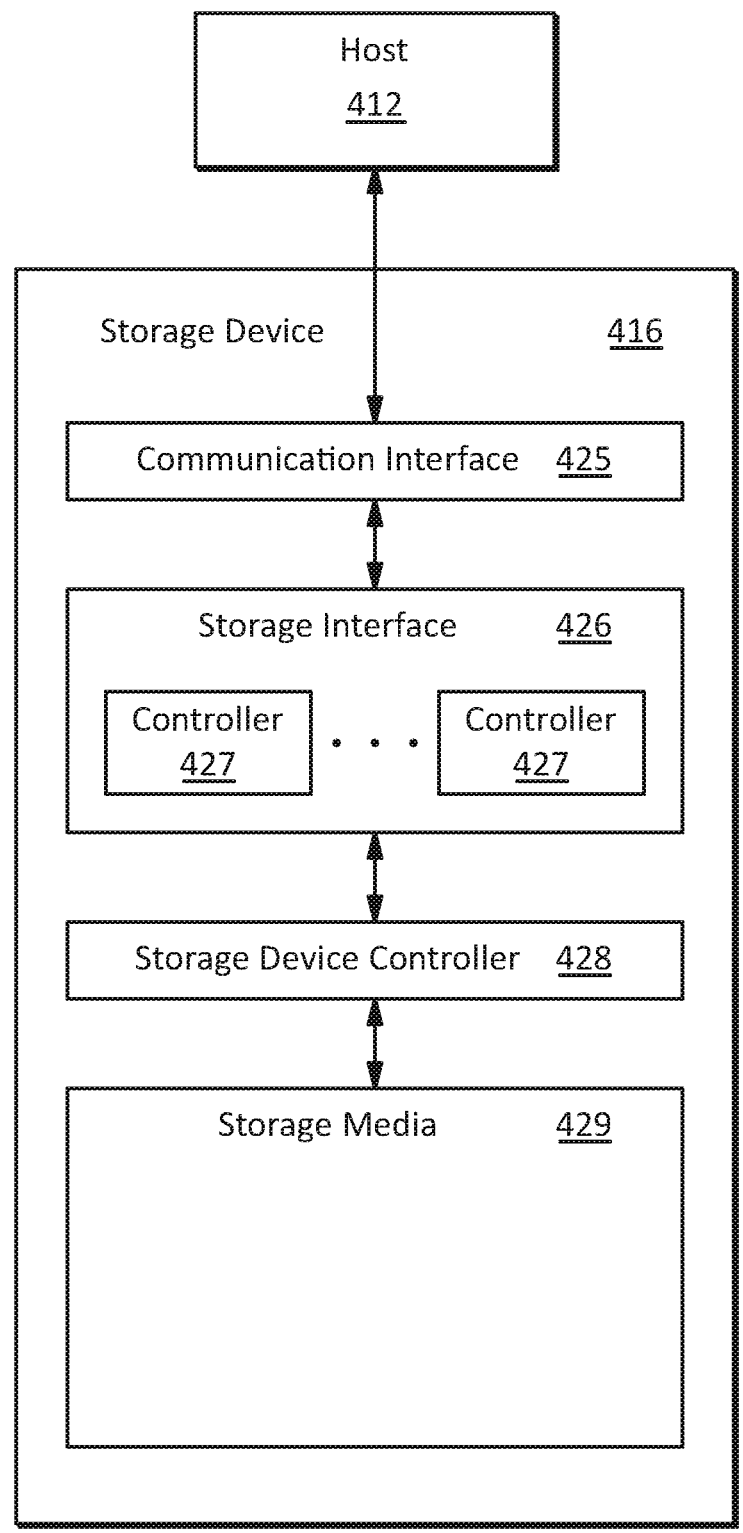
FIG. 4 illustrates an example embodiment of a storage device that may be used to implement one or more of the storage devices illustrated in FIG. 3 in accordance with example embodiments of the disclosure.

FIG. 4 illustrates an example embodiment of a storage device that may be used to implement one or more of the storage devices illustrated in FIG. 3 in accordance with example embodiments of the disclosure. The storage device 416 illustrated in FIG. 4 may include a communication interface 425, a storage interface 426, a storage device controller 428, and/or a storage media module 429. The communication interface 425, may be implemented with an interconnect interface such as Peripheral Component Interconnect Express (PCIe), a network interface such as Ethernet, and/or the like. The storage interface 426 may be implemented, for example, with Nonvolatile Memory Express (NVMe) or any other storage interface and may include one or more controllers 427. The storage device controller 428 may include various components to control the overall operation of the storage device 416 such as a media translation layer (e.g., a flash translation layer (FTL)) which may control access to storage media in the storage media module 429. The storage media module 429 may be implemented with a solid state storage media such as not-AND (NAND) flash memory, or any other type of solid state storage media, magnetic media, optical media, and/or the like.

In the storage device 416 illustrated in FIG. 4, one or more of the controllers 427 (e.g., NVMe controllers) in the storage interface 426 and/or one or more processors in the storage device controller 428 may be used to implement the peer table 320 and/or request logic 322 in the embodiment illustrated in FIG. 3.

Figure 5:
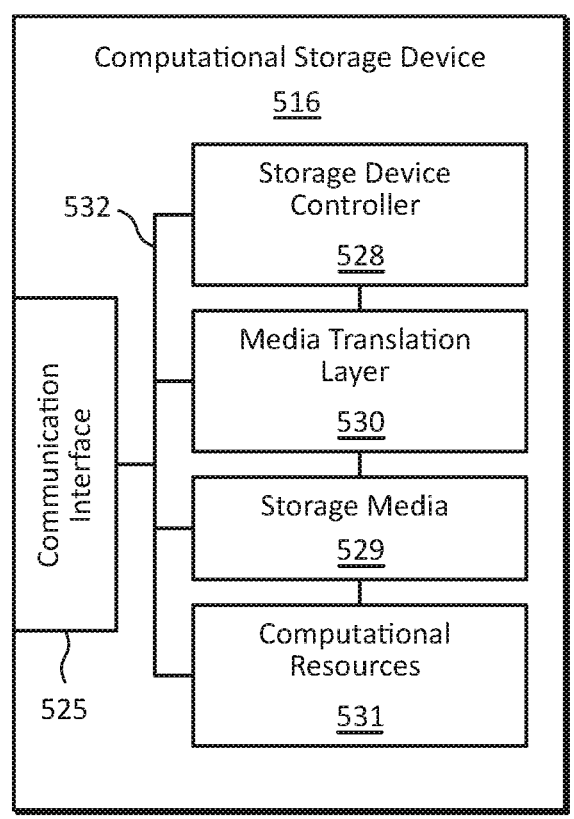
FIG. 5 illustrates another example embodiment of a storage device that may be used to implement one or more of the storage devices illustrated in FIG. 3 in accordance with example embodiments of the disclosure.

FIG. 5 illustrates another example embodiment of a storage device that may be used to implement one or more of the storage devices illustrated in FIG. 3 in accordance with example embodiments of the disclosure. The storage device 516 illustrated in FIG. 5, which may be, for example, a computational storage device, may include a storage device controller 528, a media translation layer 530, a storage media module 529, one or more computational resources 531, and a communication interface 525. The components illustrated in FIG. 5 may communicate through one or more device buses 532. In some embodiments that may use flash memory for some or all of the storage media module 529, the media translation layer 530 may be implemented partially or entirely as an FTL.

In the storage device 516 illustrated in FIG. 5, the computational resources may include processing capacity and/or memory to implement the peer table 320 and/or request logic 322 in the embodiment illustrated in FIG. 3.

Referring again to FIG. 3, in some embodiments, the host 312 may run an operating system having a discovery mechanism that may detect a newly installed storage device. In some embodiments in accordance with the disclosure, the discovery mechanism and/or storage device may be modified to include an indication (e.g., using one or more bits in a configuration field) that the newly installed storage device is capable of implementing an elastic peer system 314.

If the discovery mechanism determines that the newly installed storage device is capable of implementing an elastic peer system, the discovery mechanism may invoke an automated daemon and/or prompt a system administrator to add the newly installed storage device to the elastic peer system 314, for example, by adding it as an additional device or using it to replace a retiring device. In some embodiments, the host 312 may implement a command or user space application to add the newly installed device. In some embodiments, such a command or application may be named "nsebd-tool." An example command line interface (CLI) command for adding a newly added storage device to the elastic peer system 314 as an additional device may be as follows (e.g., in a Linux-type operating system):

sudo nsebd-tool-*t* nsebd-*a*/dev/abc/<directory>     (Cmd 1)

where sudo may indicate a superuser command, −t may be an option with the argument nsebd to perform an operation on the elastic peer system 314, −a may be an option to indicate adding the newly added storage device as an additional device, /dev/abc may indicate the location of the newly added storage device, and /<directory> may indicate a location for read and/or write requests.

An example command line interface (CLI) command for adding a newly added storage device replace a retiring storage device in the elastic peer system 314 may be as follows (e.g., in a Linux-type operating system):

sudo nsebd-tool--*t* nsebd-*s/dev/old/dev/new/*<directory>     (Cmd 2)

where sudo may indicate a superuser command, –t may be an option with the argument nsebd to perform an operation on the elastic peer system 314, –s may be an option to indicate substituting the newly added storage device for a retiring storage device, /dev/old may indicate the location of the retiring storage device, /dev/new may indicate the location of the newly added storage device, and /<directory> may indicate a location for read and/or write requests.

In some embodiments, the example commands described above may be performed dynamically while an application running on the host 312 and using the elastic peer system 314 is running. Depending on the implementation details, after executing one of the example commands described above, the application running on the host 312 may continue to write one or more files under the folder/<directory> while the elastic peer system 314 may continue to perform metadata and/or block management near storage.

In some embodiments in which one or more of the storage devices 316 may be implemented as an NVMe block device, the host 312 may send I/O requests 326 using NVMe commands. In some embodiments, NVMe command parameters may include a namespace, one or more LBAs, metadata associated with the one or more LBAs, a data transfer size, and/or the like. In some embodiments, the request logic 322 in one or more of the storage devices 316 may determine, by analyzing an incoming request 326 (e.g., solely by analyzing the request), whether the request 326 may be serviced locally by the storage device 316 or may be forwarded to a peer storage device 316 to be serviced remotely. For example, in some embodiments, the device indicator 328 of a request 326 may include an LBA for the request 326. If the LBA is within an LBA range for the receiving storage device 316, the receiving storage device 316 may service the request locally. Otherwise, if the LBA for the request 326 lies within an LBA range for a peer storage device 316, the incoming request may be transferred (e.g., immediately transferred) through the communication medium 313 to the peer storage device 316.

In some embodiments in which one or more of the storage devices 316 may be implemented as an NVMe block device, one or more NVMe drivers in the host 312 and/or storage devices 316 may be modified to enable multiple devices to share an I/O queue. Additionally, or alternatively, one or more NVMe drivers in the host 312 and/or storage devices 316 may be modified so that a request initiated in a queue for one device may be interpreted and/or processed correctly if completed in a queue for another device (e.g., if the request is forwarded from one storage device to another storage device).

In some embodiments, the elastic peer system 314 may be configured so some or all peer storage devices 316 may contain essentially identical data structures peer tables 322, and thus, one or more (e.g., any) of the peer storage devices 316 may receive, forward, and/or service any incoming NVMe command request.

Table 1 illustrates an example embodiment of a peer table in accordance with example embodiments of the disclosure. The embodiment illustrated in Table 1 may correspond, for example, to an NVMe namespace, but in other embodiments, other arrangements of tables and/or namespaces may be used. Each entry (e.g., row) in Table 1 may include a device name, an address range (e.g., an LBA range) for the corresponding device, and a device identification (ID) (e.g., a system ID) for the corresponding device).

TABLE 1

| Device Name | LBA range | Device ID/address |
| --- | --- | --- |
| Dev001 | 0x0000 to 0x0900 | <sys ID for Dev001> |
| Dev002 | 0x0901 to 0x0C00 | <sys ID for Dev002> |
| Dev003 | 0x0C01 to 0x0F00 | <sys ID for Dev003> |

Figure 6A:
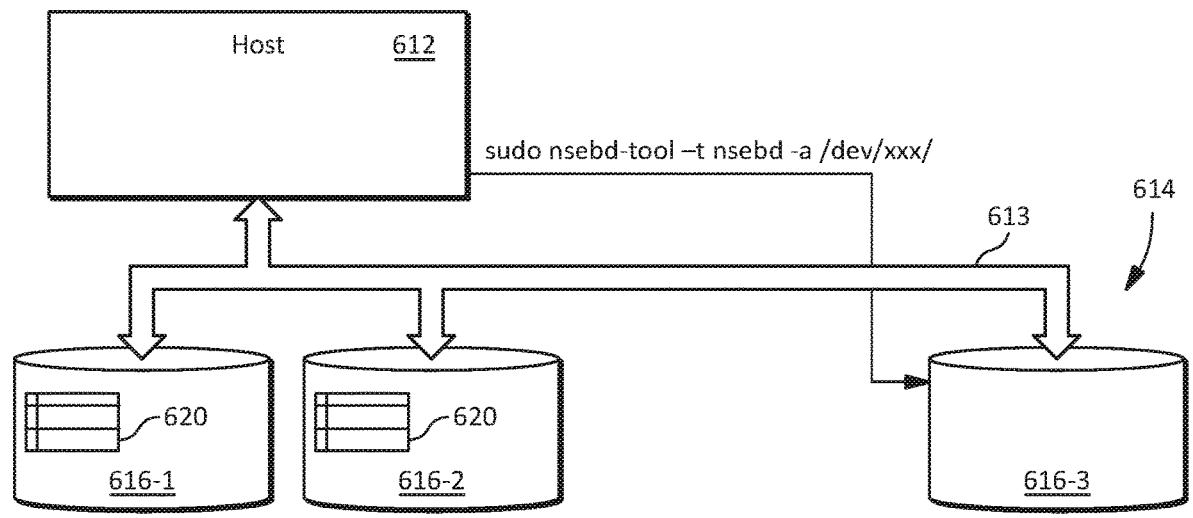
FIG. 6A illustrates an embodiment of a storage system and a first portion of a method for adding a new storage device to the storage system in accordance with example embodiments of the disclosure.
Figure 6B:
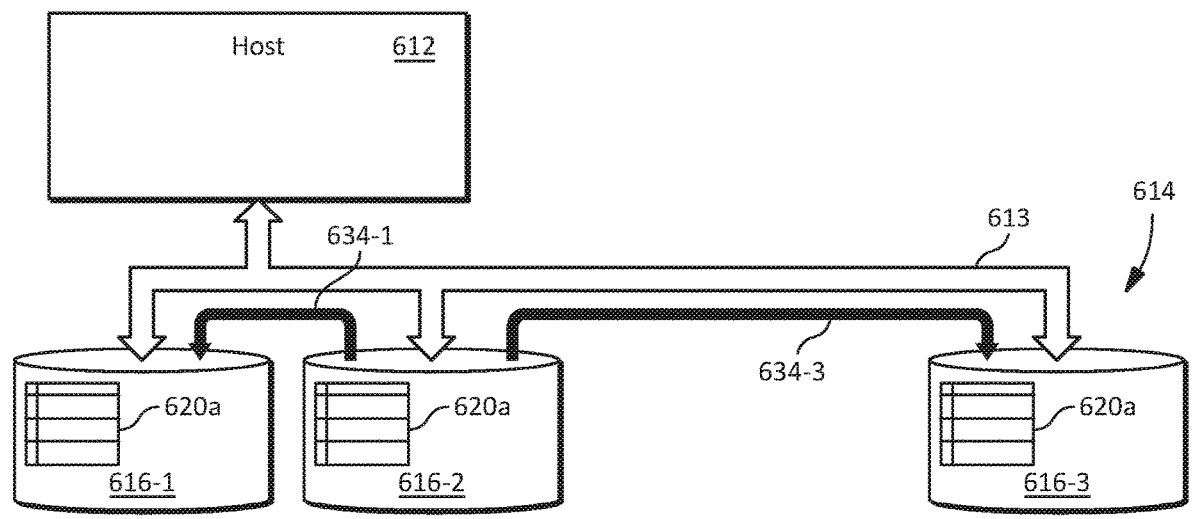
FIG. 6B illustrates an embodiment of a storage system and a second portion of a method for adding a new storage device to the storage system in accordance with example embodiments of the disclosure.

In some embodiments, an NVMe namespace may be defined as private and/or shared and may be applied, for example, to a storage device 316 and/or an NVMe controller therein. In some embodiments, a namespace may be implemented as an elastic namespace (EN) that may expand or contract, for example, to contain more or less LBAs than originally assigned. In some embodiments, an expanded namespace may reside, at least in part, in another physical storage device, but may have the same namespace as the original elastic namespace. In some embodiments, one or more additional devices may be attached to the same physical communication medium such as a PCIe bus or a local area network (LAN). In some embodiments, being attached to the same physical communication medium may be implemented as a constraint, however, in other embodiments, such a constraint may not be implemented. In some embodiments, one or more of the storage devices 316 use a peer table such as that shown in Table 1 to know how to re-direct incoming I/O commands to the queue of the device containing the EN capable of resolving the current command (e.g., the EN with the correct LBA range), FIG. 6A illustrates an embodiment of a storage system and a first portion of a method for adding a new storage device to the storage system in accordance with example embodiments of the disclosure. FIG. 6B illustrates an embodiment of a storage system and a second portion of a method for adding a new storage device to the storage system in accordance with example embodiments of the disclosure. FIG. 6A and FIG. 6B may be referred to collectively as FIG. 6. The embodiment illustrated in FIG. 6 may be implemented, for example, using any of the embodiments disclosed herein, including those illustrated in FIG. 2 and FIG. 3.

The embodiment illustrated in FIG. 6 may include a host 612 and one or more storage devices 616-1, 616-2, . . . configured to implement an elastic peer system 614. The one or more storage devices 616 may be connected to the host 612 through a communication medium 613. One or more of the storage devices 616 may include a peer table 620.

Referring to FIG. 6A, the elastic peer system 614 may initially include two storage devices 616-1 and 616-2, When a new storage device 616-3 is added, a process, daemon, and/or the like at the host 612 may invoke a command such as Cmd 1 above to install the new storage device 616-3.

Referring to FIG. 6B, after the third storage device 616-3 is added, request logic in storage device 616-2 may update the peer table 620 to generate an updated peer table 620*a* and broadcast the updated peer table 620*a* to the first and third storage devices 616-1 and 616-3 using the communication medium 613 as shown by arrows 634-1 and 634-3.

In some embodiments, rather than receiving a complete updated peer table 620*a*, one or more of the storage devices 616 may update their peer table 620 by adding an entry for the newly added storage device 616-3 and/or by activating a currently inactive entry in the peer table 620. For example, in some embodiments, one or more of the storage devices 616 may include one or more pre-populate peer tables with inactive entries, for example, with actual device sizes. Thus, when a new device is added, current peers may only need to add a location in the peer table (e.g., flip a bit in the table). In some embodiments, the available device sizes may be technology-dependent.

Figure 7A:
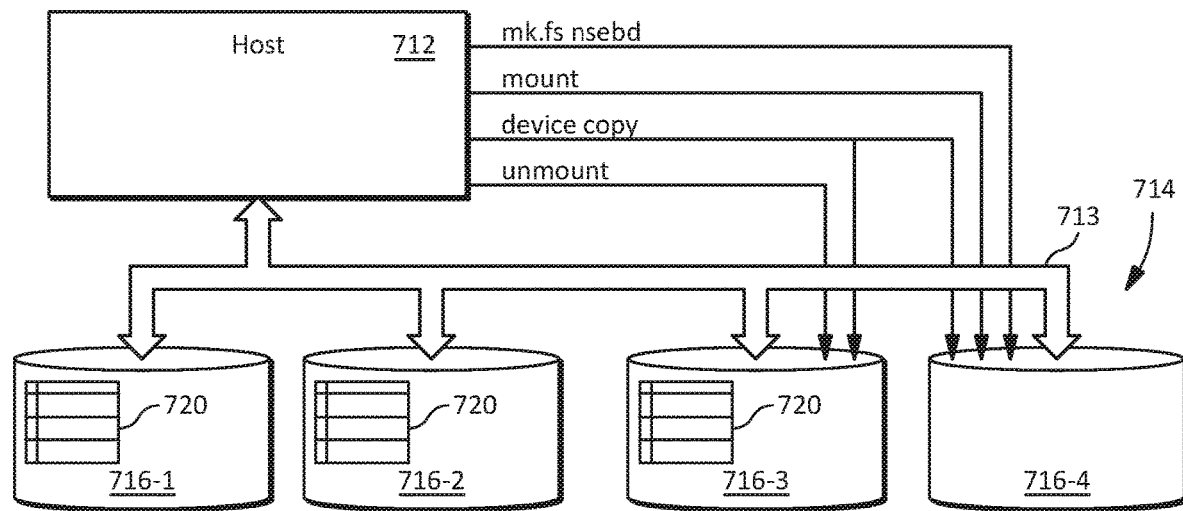
FIG. 7A illustrates an embodiment of a storage system and a first portion of a method for replacing a storage device to the storage system in accordance with example embodiments of the disclosure.
Figure 7B:
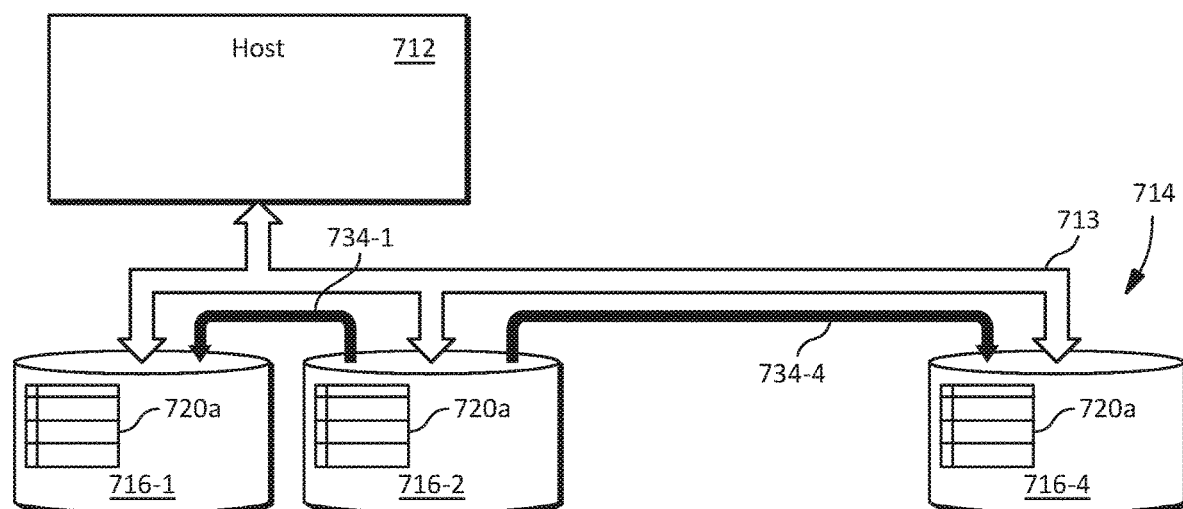
FIG. 7B illustrates an embodiment of a storage system and a second portion of a method for replacing a storage device to the storage system in accordance with example embodiments of the disclosure.

FIG. 7A illustrates an embodiment of a storage system and a first portion of a method for replacing a storage device to the storage system in accordance with example embodiments of the disclosure. FIG. 7B illustrates an embodiment of a storage system and a second portion of a method for replacing a storage device to the storage system in accordance with example embodiments of the disclosure. FIG. 7A and FIG. 7B may be referred to collectively as FIG. 7. The embodiment illustrated in FIG. 7 may be implemented, for example, using any of the embodiments disclosed herein, including those illustrated in FIG. 2 and FIG. 3.

The embodiment illustrated in FIG. 7 may include a host 712 and one or more storage devices 716-1, 716-2, . . . configured to implement an elastic peer system 714. The one or more storage devices 716 may be connected to the host 712 through a communication medium 713. One or more of the storage devices 716 may include a peer table 720.

Referring to FIG. 7A, the elastic peer system 714 may initially include three storage devices 716-1, 716-2, and 716-3. To retire the third storage device 716-3, a fourth storage device 716-4 may be added, for example, by a process, daemon, and/or the like at the host 712 that may invoke a command such as Cmd 2 above to replace the retiring storage device 716-3 with the replacement storage device 716-4. Additionally, or alternatively, the host may issue a series of commands (shown, for purposes of illustration as Linux commands) including mk.fs nsebd (to create a file system), mount (the replacement storage device 716-4), device copy (to copy the contents of the retiring storage device 716-3 to the replacement storage device 716-4), and/or unmount (the retiring storage device 716-3). In some embodiments, a background process running on one or more of the storage devices 716-1 and/or 716-2 (e.g., in the request logic) may transfer all live blocks from the retiring device to its replacement. In some embodiments, this background process must send a peer table update request to some or all of the other storage devices in the elastic peer system 714.

Referring to FIG. 7B, after the fourth (replacement) storage device 716-4 has replaced the third (retiring storage device 716-3), the request logic in storage device 716-2 may update the peer table 720 to generate an updated peer table 720*a* and broadcast the updated peer table 720*a* to the first and fourth storage devices 716-1 and 716-4 using the communication medium 713 as shown by arrows 734-1 and 734-4.

Figure 8A:
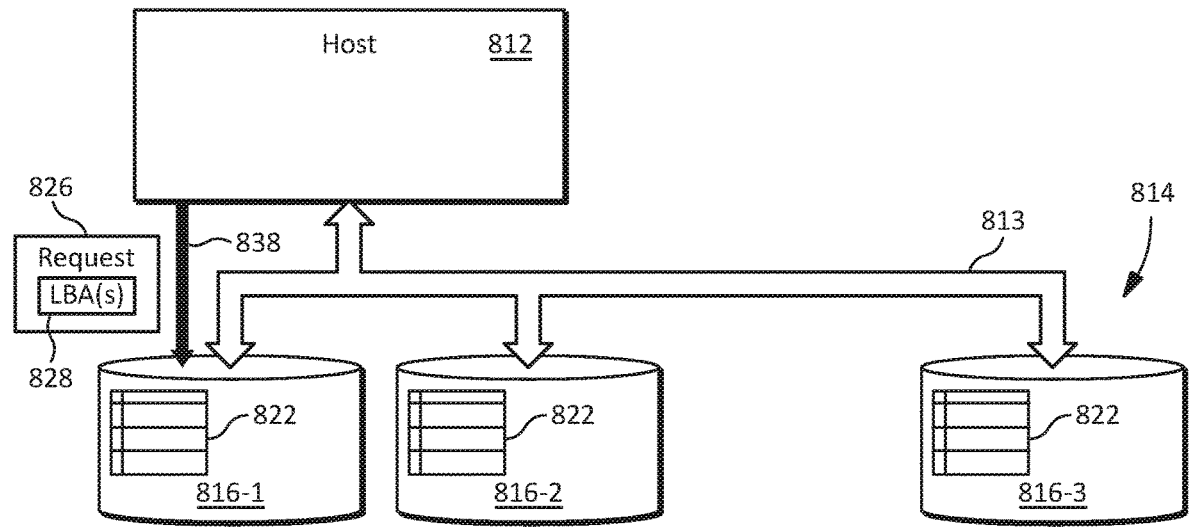
FIG. 8A illustrates an embodiment of a storage system and a first portion of an I/O method for the storage system in accordance with example embodiments of the disclosure.
Figure 8B:
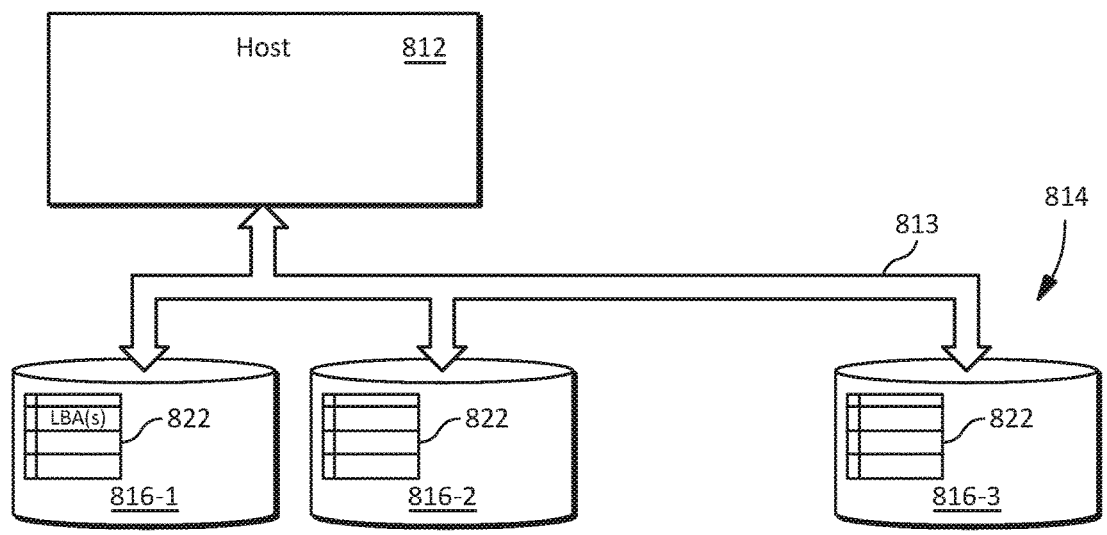
FIG. 8B illustrates an embodiment of a storage system and a second portion of an I/O method for the storage system in accordance with example embodiments of the disclosure.
Figure 8C:
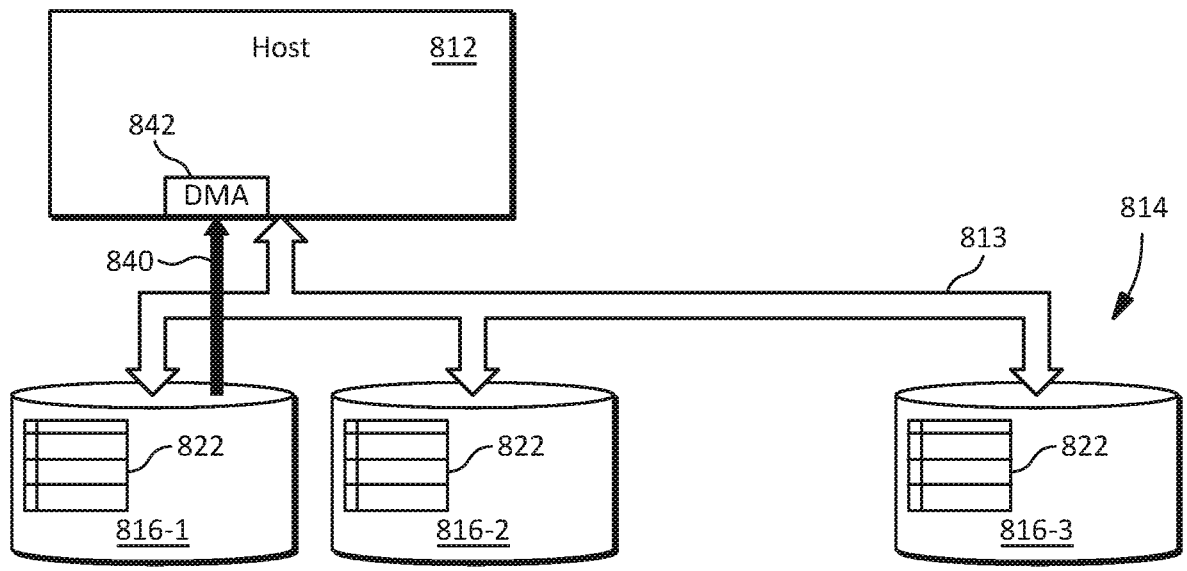
FIG. 8C illustrates an embodiment of a storage system and a third portion of an I/O method for the storage system in accordance with example embodiments of the disclosure.
Figure 8D:
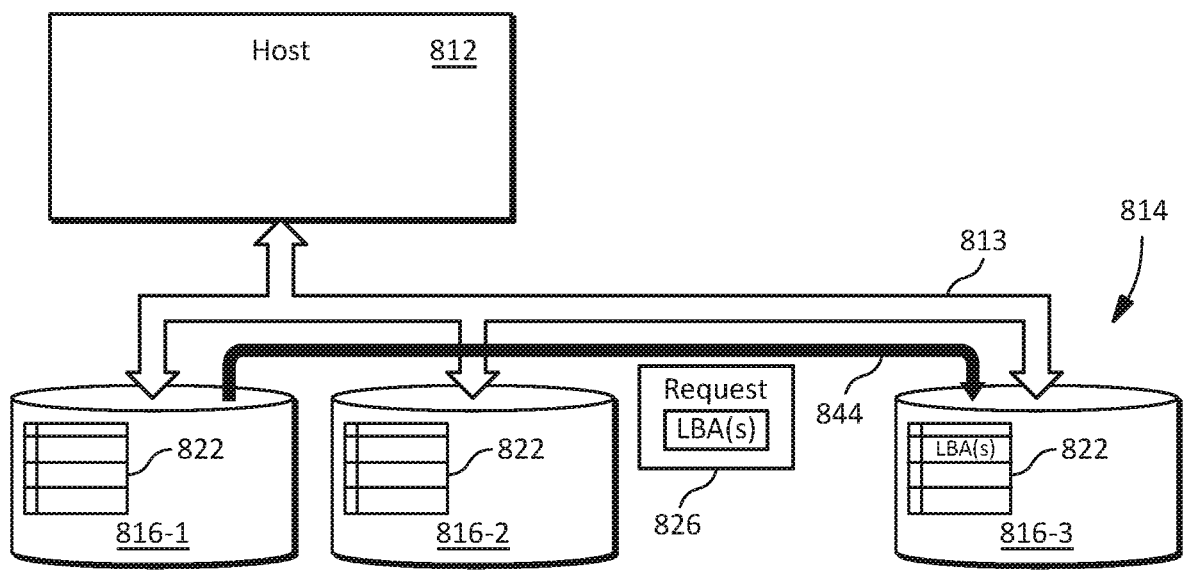
FIG. 8D illustrates an embodiment of a storage system and a fourth portion of an I/O method for the storage system in accordance with example embodiments of the disclosure.
Figure 8E:
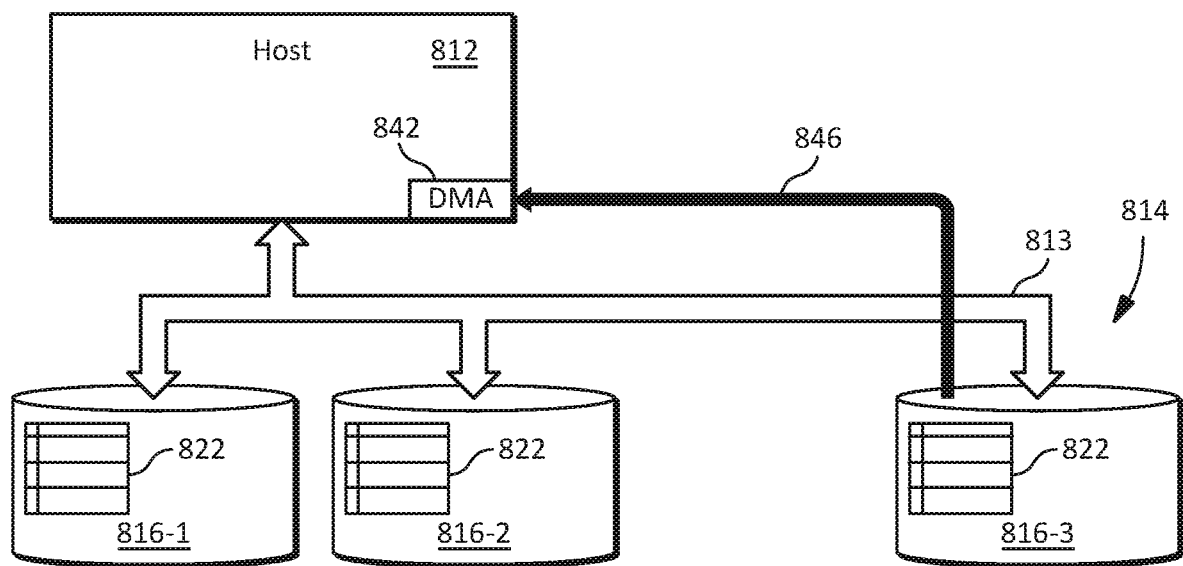
FIG. 8E illustrates an embodiment of a storage system and a fifth portion of an I/O method for the storage system in accordance with example embodiments of the disclosure.

FIG. 8A illustrates an embodiment of a storage system and a first portion of an I/O method for the storage system in accordance with example embodiments of the disclosure, FIG. 8B illustrates an embodiment of a storage system and a second portion of an I/O method for the storage system in accordance with example embodiments of the disclosure. FIG. 8C illustrates an embodiment of a storage system and a third portion of an I/O method for the storage system in accordance with example embodiments of the disclosure. FIG. 8D illustrates an embodiment of a storage system and a fourth portion of an I/O method for the storage system in accordance with example embodiments of the disclosure. FIG. 8E illustrates an embodiment of a storage system and a fifth portion of an I/O method for the storage system in accordance with example embodiments of the disclosure. FIG. 8A, FIG. 8B, FIG. 8C, FIG. 8D, and FIG. 8E, may be referred to collectively as FIG. 8. The embodiment illustrated in FIG. 8 may be implemented, for example, using any of the embodiments disclosed herein, including those illustrated in FIG. 2 and FIG. 3.

The embodiment illustrated in FIG. 8 may include a host 812 and one or more storage devices 816-1, 816-2, . . . configured to implement an elastic peer system 814. The one or more storage devices 816 may be connected to the host 812 through a communication medium 813. One or more of the storage devices 816 may include a peer table 822.

Referring to FIG. 8A, the host 812 may send an I/O request 826 to a first storage device 816-1 (e.g., Dev001 in Table 1) through the communication medium 813 as shown by arrow 838, The I/O request 826 (which may also be referred to as a request) may include one or more LBAs 828 for the I/O request 826.

Referring to FIG. 8B, the first storage device 816-1 may check its peer table 822 to see if the one or more LBAs (e.g., all of the LBAs) of the I/O request 826 are within the LBA range of the first storage device 816-1.

Referring to FIG. 8C, if the one or more LBAs of the I/O request 826 are within the LBA range of the first storage device 816-1 (e.g., the request is a local request), the first storage device 816-1 may service the I/O request 826, for example, by performing a direct memory access (DMA) transfer of data between the host 812 and the first storage device 816-1. If the I/O request 826 is a read request, the DMA transfer may read the DMA data from a storage media at the first storage device 816-1 and transfer it to a DMA buffer 842 in the host 812 as shown by arrow 840. If the I/O request 826 is a write request, the DMA transfer may transfer the data from the host 812 to the first storage device 816-1 and store the data in a storage media at the first storage device 816-1.

Referring to FIG. 8D, if the one or more LBAs of the I/O request 826 is not within the LBA range of the first storage device 816-1 (e.g., the request is a remote request), the first storage device 816-1 may forward the I/O request 826 to the storage device having the LBA range into which the one or more LBAs of the I/O request 826 falls. In the example illustrated in FIG. 8, that may be the third storage device 816-3. Thus, the first storage device 816-1 may forward the I/O request 826 to the third storage device 816-3 as shown by arrow 844.

Referring to FIG. 8E, the third storage device 816-3 may know that the one or more LBAs of the I/O request 826 fall within its LBA range because the I/O request 826 was forwarded to it by another storage device. Alternatively, or additionally, the third storage device 816-3 may check its peer table 822 to see if the one or more LBAs of the I/O request 826 are within its LBA range. The third storage device 816-3 may service the I/O request 826, for example, by performing a direct memory access (DMA) transfer of data between the host 812 and the third storage device 816-3. If the I/O request 826 is a read request, the DMA transfer may read the DMA data from a storage media at the third storage device 816-3 and transfer it to a DMA buffer 842 at the host 812 as shown by arrow 846, If the I/O request 826 is a write request, the DMA transfer may transfer the data from the host 812 to the third storage device 816-3 and store the data in a storage media at the third storage device 816-3.

Figure 9:
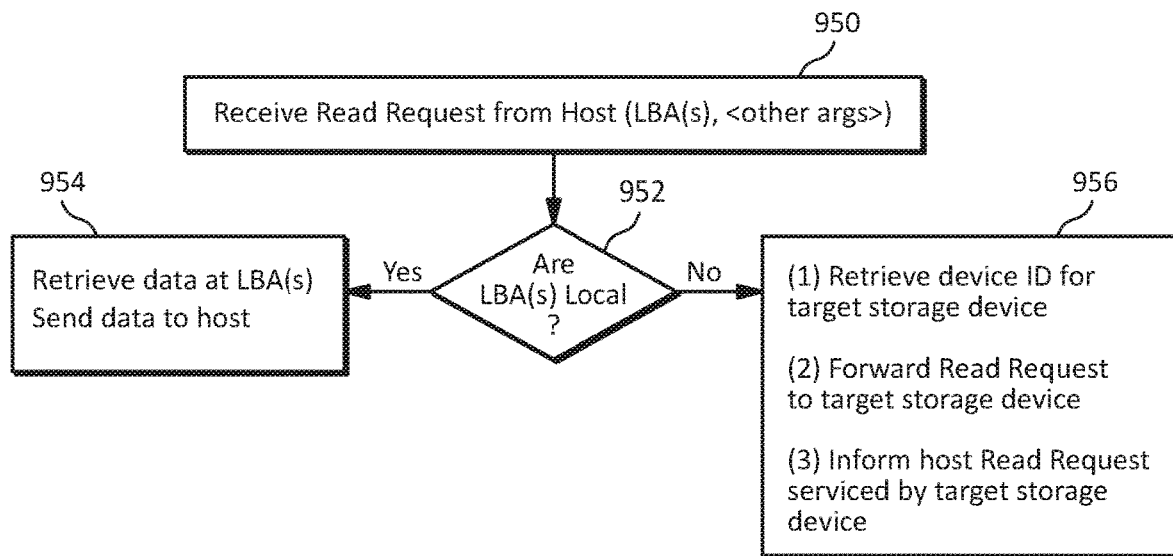
FIG. 9 illustrates an example embodiment of a method for reading data from a storage device in accordance with example embodiments of the disclosure.

In some embodiments, an I/O request may be resolved with a single forwarding of the request (e.g., a single "hop"). In other embodiments, however, a request may be forwarded multiple times to reach the storage device indicated by the LBA of the request. In some embodiments, and depending on the implementation details, a peer table may fit in available memory at a storage device (e.g., working memory used by a controller such as an NVMe controller, storage device controller, and/or the like) because (1) a directly attached storage device may have a relatively small and/or finite number of available ports, and/or (2)(a) more numerous storage devices (e.g., remote storage devices) may be connected to a remote server or switch, and thus a peer table may address the remote server and/or switch rather than the individual storage devices, and/or (2)(b), a remote entity (e.g., server and/or switch) may implement its local elastic peer system, FIG. 9 illustrates an example embodiment of a method for reading data from a storage device in accordance with example embodiments of the disclosure. The method illustrated in FIG. 9 may be implemented, for example, using any of the storage devices disclosed herein, including the embodiments illustrated in FIG. 2, FIG. 3, FIG. 5, FIG. 7, and/or FIG. 8.

Referring to FIG. 9, the method may begin at operation 950 where the storage device may receive a read request from a host. The read request may include, for example, one or more LBAs. At operation 952, the storage device may determine if the one or more LBAs of the read request are within a local LBA range of the storage device, for example, by checking a data structure such as a peer table. If the one or more LBAs of the read request are within the local LBA range of the storage device, the method may proceed to operation 954 where the storage device may retrieve the read data at the one or more LBAs specified in the read request and send the read data to the host (e.g., using a DMA transfer) The storage device may wait to receive another request and return to operation 950. If, however, at operation 952, the one or more LBAs of the read request is not within the local LBA range of the storage device, the method may proceed to operation 956 where the storage device may (1), using a data structure such as a peer table, retrieve a device ID for the target storage device having the LBA range corresponding to the read request, and (2) forward the read request to the target storage device having the LBA range corresponding to the read request. In some embodiments, the storage device may (3) inform the host that the read request will be serviced by the target storage device. The storage device may wait to receive another request and return to operation 950.

Figure 10:
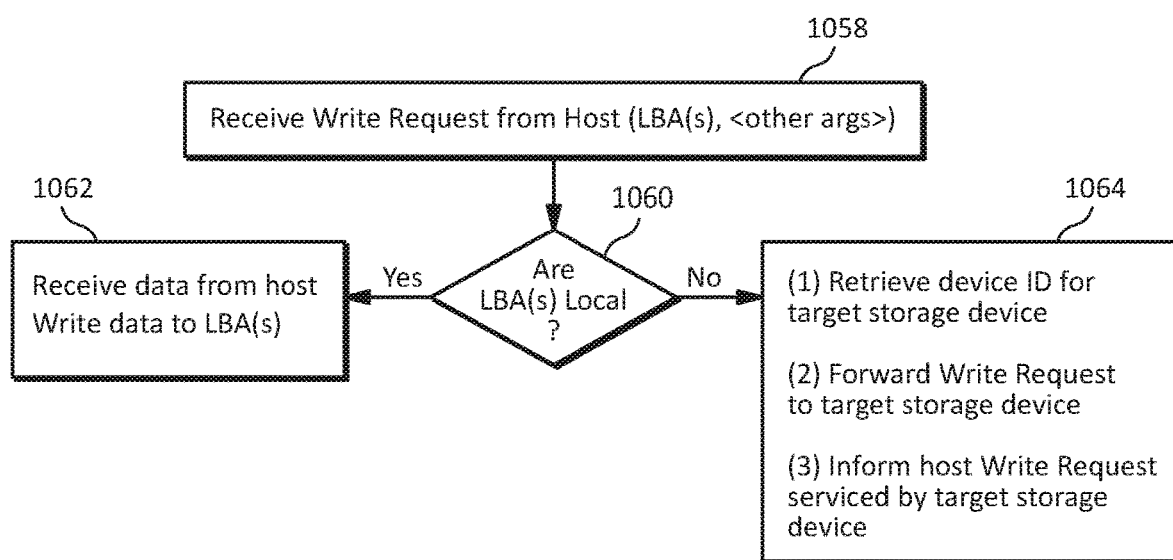
FIG. 10 illustrates an example embodiment of a method for writing data to a storage device in accordance with example embodiments of the disclosure.

FIG. 10 illustrates an example embodiment of a method for reading writing data to a storage device in accordance with example embodiments of the disclosure. The method illustrated in FIG. 10 may be implemented, for example, using any of the storage devices disclosed herein, including the embodiments illustrated in FIG. 2, FIG. 3, FIG. 6, FIG. 7, and/or FIG. 8.

Referring to FIG. 10, the method may begin at operation 1058 where the storage device may receive a write request from a host. The write request may include, for example, one or more LBAs. At operation 1060, the storage device may determine if the one or more LBAs of the write request are within a local LBA range of the storage device, for example, by checking a data structure such as a peer table. If the one or more LBAs of the write request are within the local LBA range of the storage device, the method may proceed to operation 1062 where the storage device may receive the write data from the host (e.g., using a DMA transfer) and write the data to a storage medium at the one or more LBAs specified in the write request. The storage device may wait to receive another request and return to operation 1058. If, however, at operation 1061, the one or more LBAs of the write request is not within the local LBA range of the storage device, the method may proceed to operation 1064 where the storage device may (1), using a data structure such as a peer table, retrieve a device ID for the target storage device having the LBA range corresponding to the write request, and (2) forward the write request to the target storage device having the LBA range corresponding to the write request. In some embodiments, the storage device may inform the host that the write request will be serviced by the target storage device. The storage device may wait to receive another request and return to operation 1058.

Figure 11:
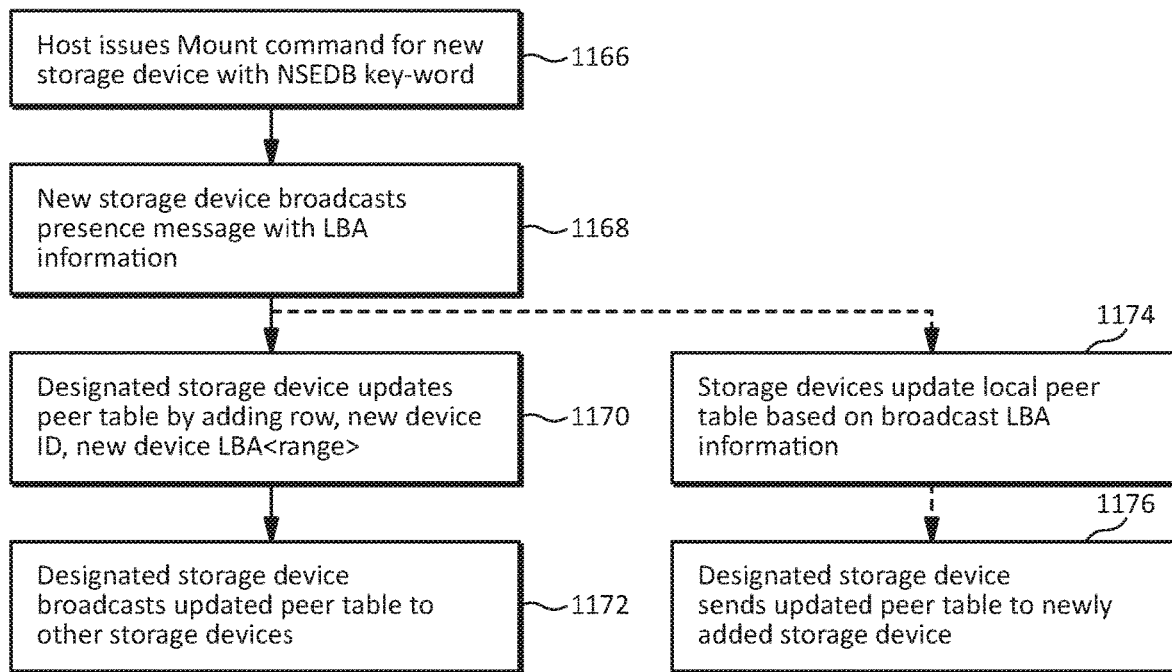
FIG. 11 illustrates an example embodiment of a method for adding a storage device to an elastic peer system in accordance with example embodiments of the disclosure.

FIG. 11 illustrates an example embodiment of a method for adding a storage device to an elastic peer system in accordance with example embodiments of the disclosure. The method illustrated in FIG. 11 may be implemented, for example, using any of the storage devices disclosed herein, including the embodiments illustrated in FIG. 2, FIG. 3, FIG. 6, FIG. 7, and/or FIG. 8.

Referring to FIG. 11, the method may begin at operation 1166 where a host may issue a mount command for a new storage device, for example, using a NSEBD key word. At operation 1168, the newly added storage device may broadcast a message informing one or more other storage devices its presence in the pool of storage devices in the elastic peer system and indicating its range of LBAs. In some embodiments, the method may proceed to operation 1170 where a designated storage device may update its peer table, for example, by adding a new entry (e.g., row) with information such as a device name, a system device ID, an LBA range, and/or the like for the newly added storage device. In some embodiments, the designated storage device may be selected by the host, by a background process at the elastic peer system, as the first added or more recently added storage device, and/or the like. The method may proceed to operation 1172 where the designated device may broadcast the updated peer table to one or more other storage devices in the elastic peer system.

Alternatively, after operation 1168, the method may proceed to operation 1174 where one or more (e.g., each) storage device in the elastic peer system may update its own local peer table based on information in the message broadcast by the newly added storage device. The method may proceed to operation 1176 where a designated storage device may send an updated peer table to the newly added storage device.

Figure 12:
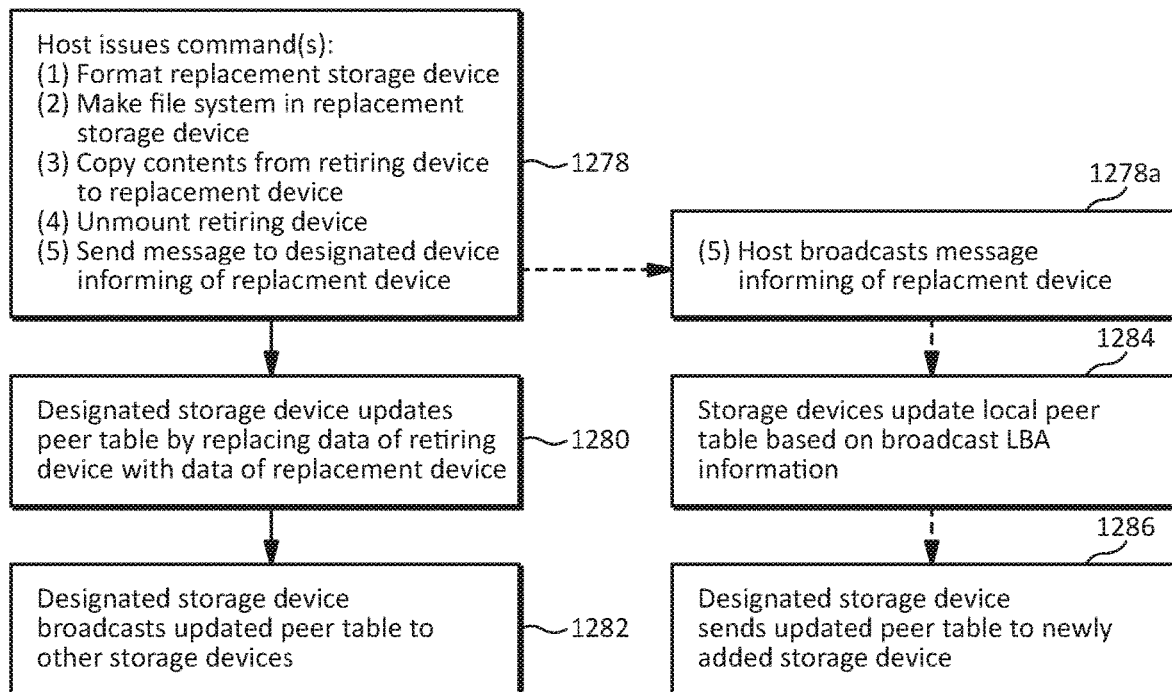
FIG. 12 illustrates an example embodiment of a method for replacing a storage device in an elastic peer system in accordance with example embodiments of the disclosure.

FIG. 12 illustrates an example embodiment of a method for replacing a storage device in an elastic peer system in accordance with example embodiments of the disclosure. The method illustrated in FIG. 12 may be implemented, for example, using any of the storage devices disclosed herein, including the embodiments illustrated in FIG. 2, FIG. 3, FIG. 6, FIG. 7, and/or FIG. 8.

Referring to FIG. 12, the method may begin at operation 1278 where a host (e.g., software at the host such as a background process, daemon, device driver, and/or the like) may issue one or more of the following commands: (1) format a replacement storage device, (2) make a file system (e.g., NSEBD file system) in the replacement storage device, (3) copy contents (e.g., device copy, disk copy, and/or the like) from the retiring storage device to the replacement storage device, (4) unmount the retiring storage device, and/or (5) send a message to a designated storage device informing the designated storage device of the replacement storage device. The method may proceed to operation 1280 where the designated storage device may update its peer table, for example, by replacing an entry (e.g., row) with information such as a device name, a system device ID, an LBA range, and/or the like for the replacement storage device. In some embodiments, the designated storage device may be selected by the host, by a background process at the elastic peer system, as the first added or more recently added storage device, and/or the like. The method may proceed to operation 1282 where the designated device may broadcast the updated peer table to one or more other storage devices in the elastic peer system.

Alternatively, at operation 1278, the method may perform an alternate command (5) (e.g., in operation 1278a) that may broadcast a message to one or more other storage devices in the elastic peer system informing the other storage devices of the replacement storage device. The method may proceed to operation 1284 where one or more (e.g., each) storage device in the elastic peer system may update its own local peer table based on information in the message broadcast by the host. The method may proceed to operation 1286 where a designated storage device may send an updated peer table to the replacement storage device.

In some embodiments, a host application may be implemented with code that may be the same or similar before or after adding or replacing a storage device in an elastic peer system. Example code in accordance with example embodiments of the disclosure is provided in Table 2.

TABLE 2

| | |
|---|---|
| 1 | int fd; |
| 2 | const char *f_data = "/dev/nvme1n1/app/data/file1.txt"; |
| 3 | fd=open(f_data, O_RDWR \| O_DIRECT \| O_CREAT \| O_SYNC \| O_TRUNC); |
| 4 | ## Continue READing and WRITing to /dev/nvme1n1 indefinitely |

In some embodiments, a request that is forwarded from a first storage device to a second storage device may include a signature, encryption protocol, and/or the like, for example, to address security issues that may arise from a second storage device servicing a request sent to a first storage device. In some embodiments, a host may be configured to expect a DMA transfer from a second peer storage device where the transfer was requested from a first peer storage device. In some embodiments, the host may send, together with the DMA location, an encrypted signature.

In some embodiments, when a first peer storage device forwards a request to a second peer storage device, the request may include information such as the DMA host location and/or a host signature. The second peer storage device may respond directly to the host at the DMA host location. In some embodiments, this transaction may further include a signature and/or equivalent hand-shake. In some embodiments, such a hand-shake protocol may include signatures of both the first and second peer storage devices.

In some embodiments, when a first storage device forwards a read request to a second storage device, the second storage device may retrieve the requested data and return it to the host through the first storage device. Depending on the implementation details, this may cause the host to only interact with the first storage device.

In some embodiments, a host may be provided with a copy of a peer table or other data structure indicating the location of data stored on one or more storage devices in an elastic peer system. To implement a read request, the host may broadcast the request (which may include one or more LBAs for the read data) to one or more (e.g., all) storage devices in the elastic peer system. The devices that do not have the corresponding LBAs may respond with a no acknowledgment (NACK), while the one storage device having LBAs corresponding to the read request may service the request.

In some embodiments, a retiring device that is being replaced may be known to a host and/or a running application. In this situation, the application and/or host may use the/<directory> name associated with the retiring device to access one or more files for the application, for example, because the elastic peer system may associate one or more (e.g., all) peer storage devices to that directory. However, if the host or application uses the device name, the replacement storage device may be renamed such that the application may still interact with the new device using the previous device name.

In one example implementation in accordance with example embodiments of the disclosure, a system may include two or more devices arranged essentially without a hierarchy. For example, one or more (e.g., all) of the devices may be similar or the same (e.g., in the sense that one or more (e.g., any) of the devices may receive and service a request). To implement this arrangement, one or more (e.g., each) of the devices may include (1) a peer table with global information of one or more (e.g., all) other devices in the system, and (2) a minimum amount of local computing capability to determine (e.g., based on one or more LBAs included with a request) whether the device (a) is the intended subject of the request (e.g., whether the device includes one or more LBAs for a read or write request), and therefore may service the request, (b) or should forward the request to another device. Depending on the implementation details, this may provide simple yet powerful technique that, for example, may be implemented efficiently using devices with limited computing power (using FPGAs) and/or may enable a system with two or more devices to keep track of the location of data is, and/or to allow the system to grow seamlessly.

In some embodiments, and depending on the implementation details, a system, method, apparatus, device, and/or the like in accordance with example embodiments of the disclosure may implement any number of the following features and/or provide any number of the following advantages.

In some embodiments, one or more storage devices (e.g., NVMe storage devices and/or computational storage devices) may be implemented with one or more internal controllers that may be adapted to implement an elastic peer system as disclosed herein.

In some embodiments, an NSEBD system (e.g., ecosystem) may include one or more storage devices (e.g., computational storage devices) that may collaborate using near storage intelligence and/or a peer-to-peer infrastructure (e.g., without a hierarchy) to provide devices capable of expanding their capacity dynamically.

In some embodiments, an NSEBD system may help accelerate a distributed file system and/or their applications in single servers, clusters, and/or other distributed environments.

In some embodiments, an NSEBD system may be leveraged by existing distributed file systems. In such embodiments, an NSEBD system may improve efficiencies, for example, by reducing latencies, increasing throughput, and/or providing a more reliable consistency model.

In some embodiments, an NSEBD system may be implemented independently and/or accessed by an application in a manner similar to a block device.

In some embodiments, an NSEBD device replacement method mechanism may effectively add fault tolerance to an NSEBD system infrastructure.

In some embodiments, when replacing or collaborating with SDS infrastructure, an NSEBD system may decrease CPU and/or RAM utilization in one or more hosts.

Figure 13:
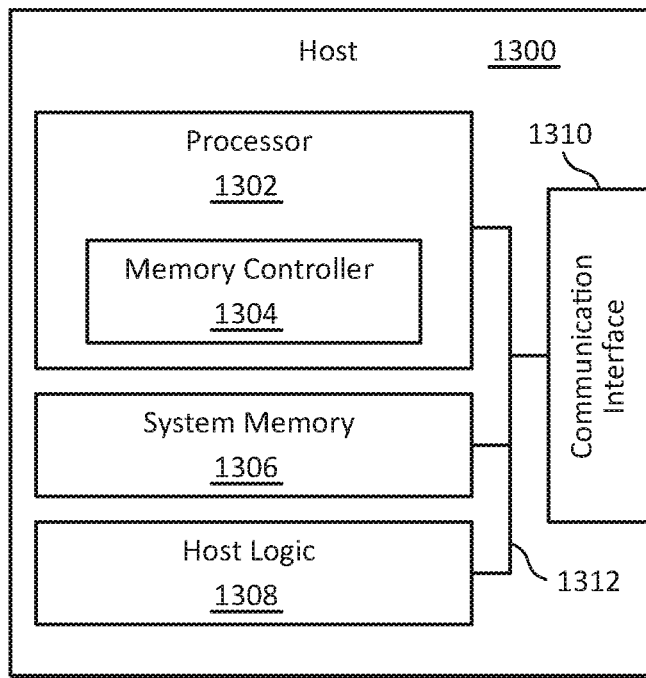
FIG. 13 illustrates an example embodiment of a host apparatus that may be used to provide a user with access to a device program in accordance with example embodiments of the disclosure.

FIG. 13 illustrates an example embodiment of a host apparatus that may be used to provide a user with access to a device program in accordance with example embodiments of the disclosure. The host apparatus 1300 illustrated in FIG. 13 may include a processor 1302, which may include a memory controller 1304, a system memory 1306, host control logic 1308, and/or an interconnect interface 1310, which may be implemented, for example using CXL. Any or all of the components illustrated in FIG. 13 may communicate through one or more system buses 1312. In some embodiments, one or more of the components illustrated in FIG. 13 may be implemented using other components. For example, in some embodiments, the host control logic 1308 may be implemented by the processor 1302 executing instructions stored in the system memory 1306 or other memory. In some embodiments, the host control logic 1308 may be used to implement any of the host functionality disclosed herein including, for example, the host logic 324 illustrated in FIG. 3.

Any of the functionality described herein including that described with respect to FIG. 1, FIG. 2, FIG. 3, FIG. 4, FIG. 5, FIG. 6, FIG. 7, FIG. 8, FIG. 9, FIG. 10, FIG. 11, and/or FIG. 12 may be implemented with hardware, software, or any combination thereof including combinational logic, sequential logic, one or more timers, counters, registers, state machines, volatile and/or nonvolatile memories, CPLDs, FPGAs, ASICs, CPUs including CISC processors such as x86 processors and/or RISC processors such as ARM processors, GPUs, NPUs, TPUs, and/or the like, executing instructions stored in any type of memory. In some embodiments, one or more components may be implemented as a system-on-chip (SOC).

Figure 14:
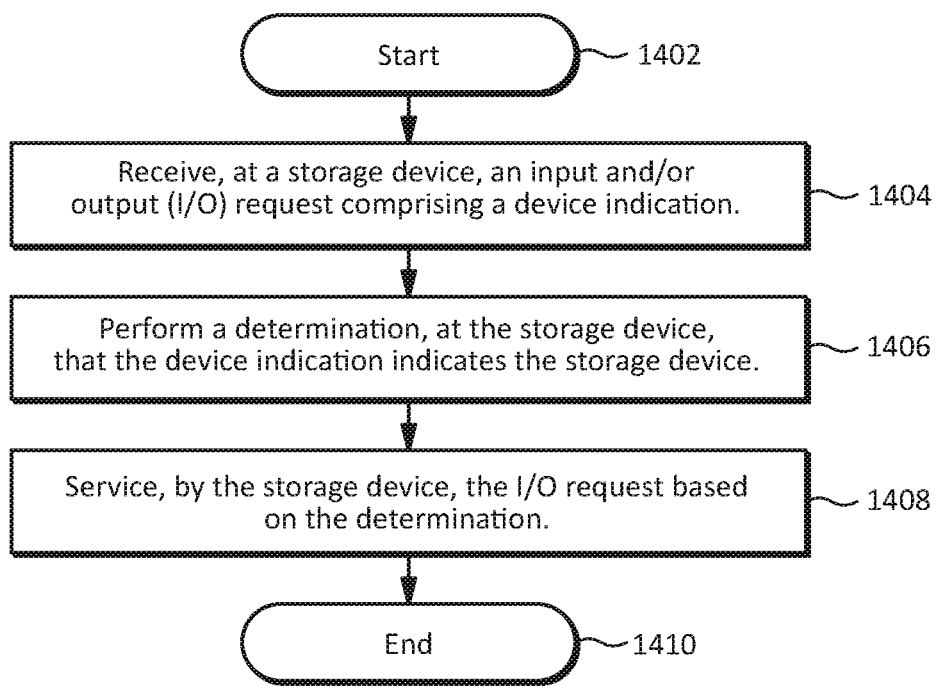
FIG. 14 illustrates an embodiment of a method for storing data in accordance with example embodiments of the disclosure.

FIG. 14 illustrates an embodiment of a method for storing data in accordance with example embodiments of the disclosure. The method may begin at operation 1402. At operation 1404, the method may receive, at a storage device, an input and/or output (I/O) request comprising a device indication. A device indication may be implemented, for example, with an LBA. At operation 1406, the method may perform a determination, at the storage device, that the device indication indicates the storage device. For example, the determination may be based on an LBA in the I/O request matching a range of LBAs at the storage device. At operation 1408, the method may service, by the storage device, the I/O request based on the determination. For example, the storage device may perform a read and/or write operation based on the I/O request. The method may end at operation 1410.

The embodiment illustrated in FIG. 14, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, a reference to a thing may refer to at least a portion of the thing, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method for storing data, the method comprising:
receiving a first communication to add a first storage device;
receiving, at the first storage device and a second storage device, a second communication from a third storage device, the second communication comprising address information of the first storage device, wherein the first storage device and second storage device update a data structure based on the address information of the first storage device;
receiving, at the second storage device, an input and/or output (I/O) request comprising a device indication;
performing a determination based on the data structure, at the second storage device, that the device indication indicates the second storage device; and
servicing, by the second storage device, the I/O request based on the determination.

2. The method of claim 1, wherein the device indication comprises an address for the I/O request.

3. The method of claim 1, wherein the first storage device, the second storage device, and the third storage device are installed in a storage system.

4. The method of claim 3, wherein the first storage device, the second storage device, and the third storage device are peer devices.

5. The method of claim 3, wherein the I/O request is a first I/O request, the device indication is a first device indication, and the determination is a first determination, the method further comprising:
receiving, at the second storage device, a second I/O request comprising a second device indication;
performing a second determination, by the second storage device, that the second device indication indicates the first storage device, wherein the second determination is based on the data structure; and
forwarding, by the second storage device, the second I/O request to the first storage device based on the second determination.

6. The method of claim 5, further comprising servicing, by the first storage device, the second I/O request.

7. The method of claim 5, wherein performing the first determination is based on a first entry for the second storage device in the data structure, the method further comprising modifying the data structure on the second storage device, based on the address information of the first storage device, by adding a second entry for the first storage device.

8. The method of claim 7, wherein performing the second determination is based on the second entry.

9. The method of claim 8, wherein:
the first entry comprises a first address range for the second storage device; and
the second entry comprises a second address range of the first storage device.

10. The method of claim 7, wherein at least a portion of the data structure comprises the first entry, and the second entry is stored at the first storage device and the second storage device.

11. The method of claim 5, further comprising:
storing, in a first I/O queue, the first I/O request; and
forwarding, by the second storage device, to a second I/O queue, the second I/O request.

12. A storage device comprising:
a storage medium;
a communication interface; and
a control circuit comprising request logic configured to:
receive a first communication to add a first storage device, wherein the storage device is a second storage device;
receive a second communication from a third storage device, the second communication comprising address information of the first storage device;
update a data structure based on the address information of the first storage device;
receive, using the communication interface, an input and/or output (I/O) request comprising a device indication;
perform a determination, based on the data structure, that the device indication indicates the first storage device; and
service, using the storage medium, the I/O request based on the determination.

13. The storage device of claim 12, wherein the I/O request is a first I/O request, the device indication is a first device indication, the determination is a first determination, and the request logic is further configured to:
receive, using the communication interface, a second I/O request comprising a second device indication;
perform a second determination that the second device indication indicates the first storage device, wherein the second determination is based on the data structure; and
forward, using the communication interface, the second I/O request to the first storage device based on the second determination.

14. The storage device of claim 12, wherein:
the determination is based on an entry for the second storage device in the data structure; and
the request logic is further configured to generate an updated version of the data structure based on the address information of the first storage device, wherein the first storage device is installed in a storage system with the second storage device.

15. The storage device of claim 14, wherein the request logic is further configured to receive, using the communication interface, the updated version of the data structure from the third storage device.

16. The storage device of claim 12, wherein:
the determination is based on an entry for the second storage device in a data structure; and
the request logic is further configured to receive, using the communication interface, an updated version of the data structure.

17. A system comprising:
a host;
a first storage device, second storage device, and third storage device; and
a communication medium coupled to the host and the second storage device;
wherein the host comprises host logic configured to send, using the communication medium, an input and/or output (I/O) request to the second storage device, wherein the I/O request comprises a device indication;
wherein the second storage device comprises first request logic configured to:
receive a first communication from the third storage device, the first communication comprising address information of the first storage device;
update a data structure on the second storage device based on the address information of the first storage device;
receive the I/O request;
perform a determination, based on the data structure, that the device indication indicates the second storage device; and
service, by the second storage device, the I/O request based on the determination; and
wherein the third storage device comprises second request logic configured to:
broadcast to the first storage device and second storage device information to update, based on the first storage device, the data structure on the first storage device and a data structure on the second storage device.

18. The system of claim 17, wherein the host logic is further configured to perform an installation of the first storage device.

19. The system of claim 18, wherein:
the determination is based on an entry for the second storage device in a data structure; and
the first request logic is further configured to generate an updated version of the data structure based on the installation.

20. The system of claim 19, wherein the second request logic is further configured to send the updated version of the data structure to the first storage device and second storage device.

\* \* \* \* \*